(12) United States Patent
Knoth

(10) Patent No.: US 8,051,320 B2
(45) Date of Patent: Nov. 1, 2011

(54) CLOCK RATIO CONTROLLER FOR DYNAMIC VOLTAGE AND FREQUENCY SCALED DIGITAL SYSTEMS, AND APPLICATIONS THEREOF

(75) Inventor: Matthias Knoth, San Jose, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 931 days.

(21) Appl. No.: 12/000,413

(22) Filed: Dec. 12, 2007

(65) Prior Publication Data

US 2009/0158078 A1    Jun. 18, 2009

(51) Int. Cl.
- G06F 1/12 (2006.01)
- G06F 13/42 (2006.01)
- G06F 1/04 (2006.01)
- H04L 7/00 (2006.01)

(52) U.S. Cl. ........ 713/503; 713/400; 713/500; 327/156; 327/158

(58) Field of Classification Search .................. 713/400, 713/500, 503; 327/156, 158
See application file for complete search history.

(56) References Cited

U.S. PATENT DOCUMENTS

| | | | |
|---|---|---|---|
| 2003/0056137 A1* | 3/2003 | Huelskamp | 713/600 |
| 2004/0100310 A1* | 5/2004 | Kurakane | 327/114 |
| 2005/0063502 A1* | 3/2005 | Ware et al. | 375/354 |
| 2005/0184773 A1* | 8/2005 | Boyko et al. | 327/156 |
| 2006/0143491 A1* | 6/2006 | Lin et al. | 713/600 |
| 2006/0288249 A1* | 12/2006 | Knepper et al. | 713/500 |
| 2007/0016814 A1* | 1/2007 | Rusu et al. | 713/320 |
| 2007/0025453 A1* | 2/2007 | Terashima et al. | 375/257 |
| 2007/0025489 A1* | 2/2007 | Milton et al. | 375/375 |
| 2007/0063748 A1* | 3/2007 | Chung | 327/158 |
| 2007/0288786 A1* | 12/2007 | Miller | 713/500 |
| 2008/0252339 A1* | 10/2008 | Corcelli | 327/145 |
| 2008/0288804 A1* | 11/2008 | Gorti et al. | 713/400 |

* cited by examiner

*Primary Examiner* — Vincent Tran

(74) *Attorney, Agent, or Firm* — Sterne, Kessler, Goldstein & Fox P.L.L.C.

(57) ABSTRACT

The present invention provides a clock ratio controller for dynamic voltage and frequency scaled digital systems, and applications thereof. In an embodiment, a digital system is provided that includes a first digital circuit that operates at a first rate determined by a first clock signal and a second digital circuit that operates at a second rate determined by a second clock signal. The first digital circuit is coupled to the second digital circuit by a bus that is used for communications between the first digital circuit and the second digital circuit. A clock ratio controller is used to adjust the frequency of the first clock signal and/or the second clock signal in response to a power management signal without causing a loss of synchronization between the first digital circuit and the second digital circuit.

14 Claims, 11 Drawing Sheets

CLOCK RATIO CONTROLLER FOR DYNAMIC VOLTAGE AND FREQUENCY SCALED DIGITAL SYSTEMS, AND APPLICATIONS THEREOF

FIELD OF THE INVENTION

The present invention generally relates to digital systems. More particularly, it relates to a clock ratio controller for dynamic voltage and frequency scaled digital systems, and applications thereof.

BACKGROUND OF THE INVENTION

Dynamic voltage and frequency scaling are techniques for achieving low power consumption in digital systems while maintaining just enough processing speed to ensure that processing tasks are timely satisfied. While these techniques are useful for reducing power consumption, dynamically changing clocking frequencies in conventional digital systems result in loss of synchronization between various system elements. As a result, communications and the exchange of data between various components are disrupted until a resynchronization occurs. What are needed are improved techniques for implementing dynamic voltage and frequency scaling that overcome the limitations noted above.

BRIEF SUMMARY OF THE INVENTION

The present invention provides a clock ratio controller for dynamic voltage and frequency scaled digital systems, and applications thereof. In an embodiment, the clock ratio controller is used, for example, to adjust the frequency of clock signals of a digital system without a loss of synchronization between system elements.

In an embodiment, the present invention provides a digital system that includes a first digital circuit that operates at a first rate determined by a first clock signal and a second digital circuit that operates at a second rate determined by a second clock signal. The first digital circuit is coupled to the second digital circuit by a bus that is used for communicating between the first digital circuit and the second digital circuit. A clock ratio controller is used to adjust the frequency of the first clock signal and/or the second clock signal in response to a power management signal without causing a loss of synchronization between the first digital circuit and the second digital circuit.

In an embodiment, the clock ratio controller detects alignments between edges of the first clock signal and edges of the second clock signal and adjusts the frequency of the first clock signal and/or the second clock signal during a detected alignment.

In an embodiment, the clock ratio controller outputs strobe signals that enable operation of transmit registers and receive registers of the first digital circuit and the second digital circuit. These transmit registers and receive registers are used to facilitate communications between the first digital circuit and the second digital circuit.

It is a feature of the present invention that it can be used to manage power consumption in a digital system. It is also a feature of the present invention that it can be used to implement a wide range of different clock ratios between two clock signals including arbitrary clock ratios.

Further embodiments, features, and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the present invention and to enable a person skilled in the pertinent art to make and use the present invention.

FIGS. 1A-B are diagrams that illustrate an example digital system according to an embodiment of the present invention.

FIGS. 2A-B are diagrams that illustrate an example clock ratio controller according to an embodiment of the present invention.

The present invention is described with reference to the accompanying drawings. The drawing in which an element first appears is typically indicated by the leftmost digit or digits in the corresponding reference number.

DETAILED DESCRIPTION OF THE INVENTION

The present invention provides a clock ratio controller for dynamic voltage and frequency scaled digital systems, and applications thereof. In the detailed description of the present invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As will become apparent from the detailed described herein, the present invention can be used to create and implement high performance, ultra low power digital systems. In embodiments, the present invention is used, for example, to enable dynamic scaling in multiprocessor systems without a loss of synchronization between the processors and other elements in the system due to frequency changes. Because synchronization is maintained, both the performance and the reliability of the digital systems are increased by the present invention.

Figure 1A:
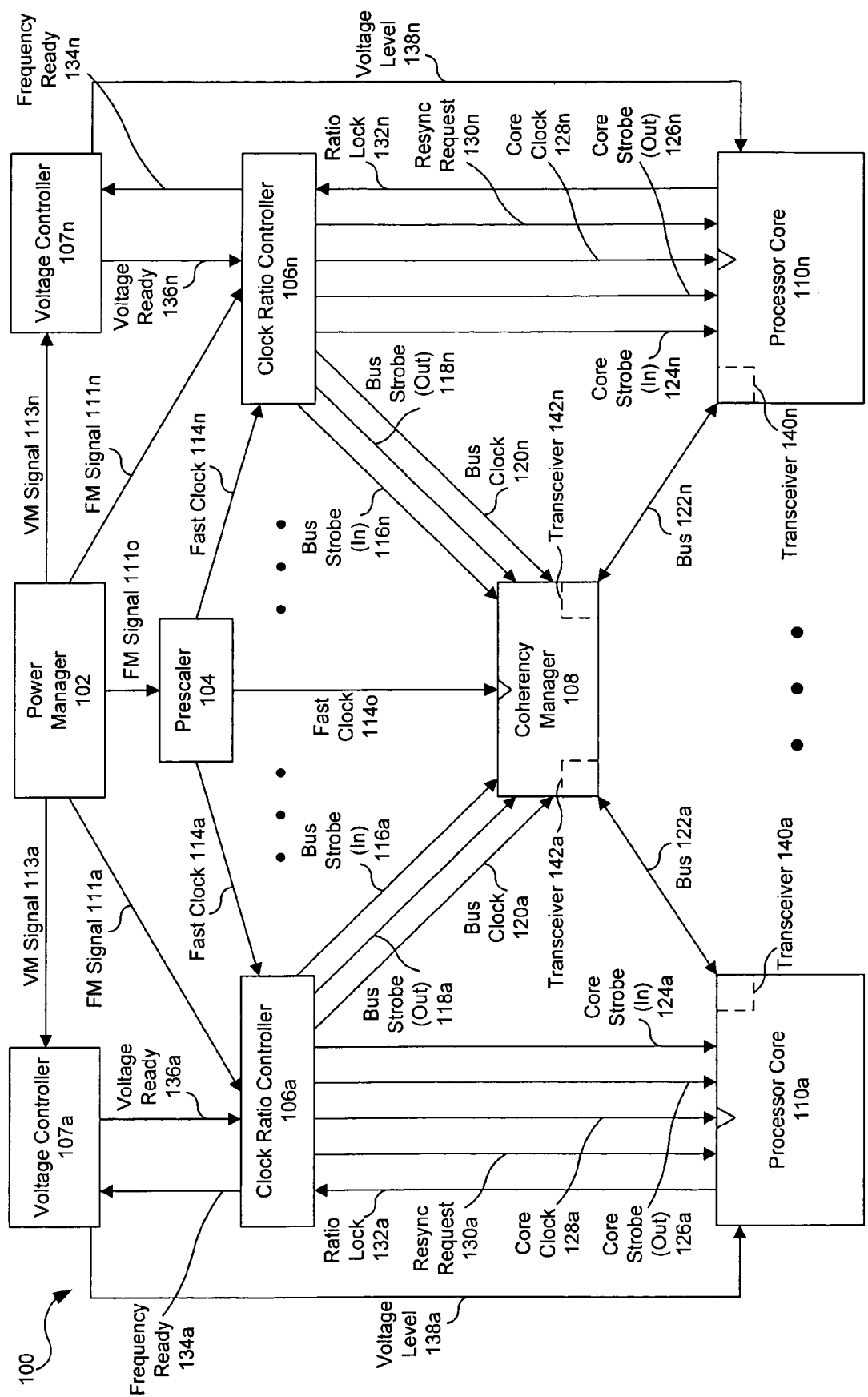
Figure 1B:
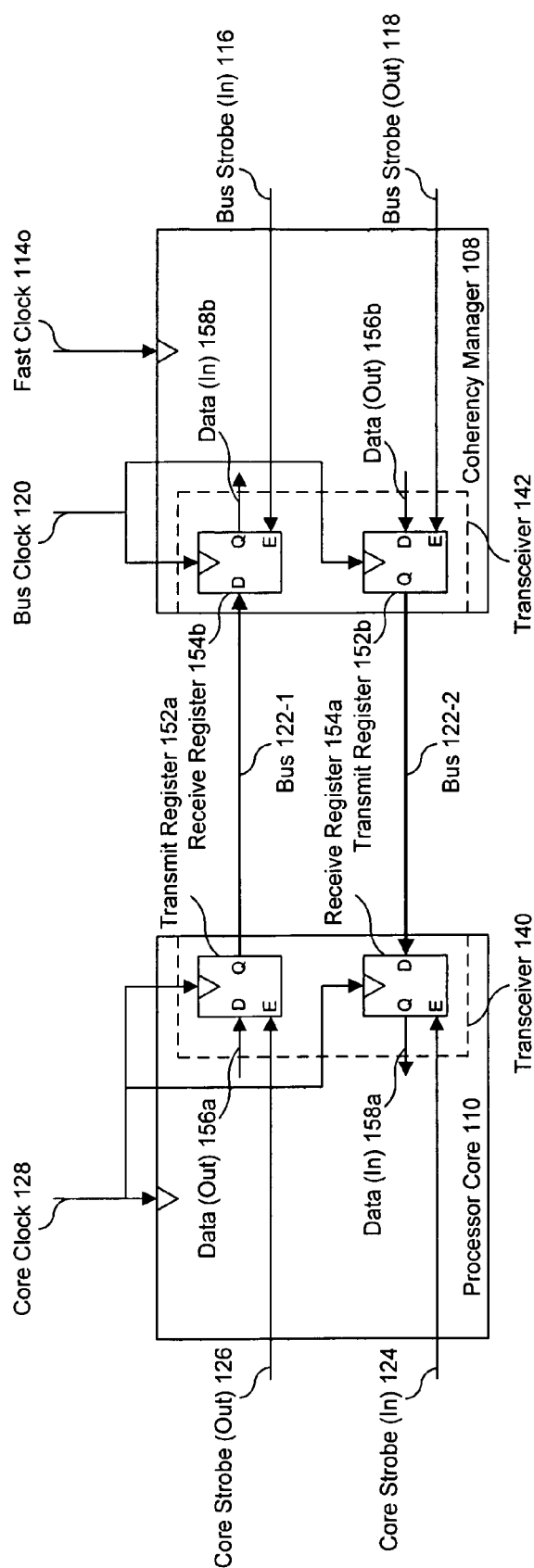

FIGS. 1A-B are diagrams of an exemplary digital system 100 according to an embodiment of the present invention. As shown in FIG. 1A, digital system 100 includes, but is not limited to, a power management unit 102, a prescaler 104, a plurality of clock ratio controllers 106a-n, a plurality of voltage controllers 107a-n, a coherency manager 108, and a plurality of processor cores 110a-n.

As illustrated in FIG. 1A, in one embodiment, digital system 100 is a multiprocessor digital system that includes at least two processor cores 110. The present invention, however, is not limited to multiprocessor digital systems. The invention encompasses, for example, any digital system that has a first digital circuit and a second digital circuit coupled together by a bus.

Power management unit 102 determines when a voltage and/or a frequency of one or more digital circuits such as processor cores 110 may be adjusted to affect power consumption and/or heat generation. If the voltage of a processor core 110 is to be decreased, the frequency of processor core 110 may be lowered first, for example, in instances where the voltage sets a maximum speed at which processor core 110 can run. If the voltage of processor core 110 is to be increased, the frequency of processor core 110 may be raised, for example, after the voltage increase.

In an embodiment, power management unit 102 provides individual frequency management (FM) signals 111a-n to clock ratio controllers 106a-n and individual voltage management (VM) signals 113a-n to voltage controllers 107a-n. These signals are also referred to herein as power management signals. A FM signal 111o is also provided to prescaler 104. These FM signals are used, for example, to initiate frequency adjustments. The VM signals are used, for example, to initiate voltage adjustments. FM signals 111a-n can be used to individually control/scale the frequency of each processor core 110a-n. VM signals 113a-n can be used to individually control/scale the voltage of each processor core 110a-n. FM signal 111o can be used to control/scale the frequency of all of the components of digital system 100.

Prescaler 104 is used to determine the fastest clocking signal that is used in digital system 100. Prescaler 104 provides this clock signal to clock ratio controllers 106a-n and coherency manager 108 via fast clock signals 114a-o. In an embodiment, fast clock signal 114o is equal in frequency to the clocking signal that is used to clock the processor core 110 running the fastest. In an embodiment, when an FM signal 111 associated with the fastest running processor core 110 is adjusted, power manager 102 sends FM signal 111o to prescaler 104 to notify prescaler 104 of the change. Prescaler 104 adjusts fast clock signals 114a-o accordingly.

Clock ratio controllers 106a-n generate the clock or clocking signals used to control processor cores 110a-n and data communications on busses 122a-n. As shown in FIG. 1A, in an embodiment, each clock ratio controller 106a-n generates a core clock signal 128 used to drive an associated processor core 110 and a bus clock signal 120 used to drive an associated transmitter/receiver or transceiver 142 of coherency manager 108. These clocking signals are based on the fast clock signal 114a-n received by clock ratio controllers 106a-n. Core clock signals 128a-n and bus clock signals 120a-n are not required to operate at the same frequency, nor do core clock signals 128a-n have to be faster or slower than bus clock signals 120a-n.

As shown in FIG. 1A, in an embodiment, clock ratio controllers 106a-n generate bus strobe (in) signals 116a-n, bus strobe (out) signals 118a-n, core strobe (in) signals 124a-n, and core strobe (out) signals 126a-n. Bus strobe (in) signals 116a-n determine when coherency manager 108 reads data received on the respective busses 122a-n. Bus strobe (out) signals 118a-n determine when coherency manager 108 transmits data on the respective busses 122a-n. Core strobe (in) signals 124a-n determine when the respective processor cores 110a-n read received data. Core strobe (out) signals 126a-n determine when the respective processor cores 110a-n transmit data. In embodiments, these strobe signals strobe/control transmit/receive registers used to temporarily store data sent and received by a processor core 110 and coherency manager 108 over an associated bus 122. This embodiment is described in greater detail below with respect to FIG. 1B.

In an embodiment, clock ratio controllers 106a-n also generate resynchronization (resync) requests 130a-n and receive ratio lock signals 132a-n. These signals are used, for example, to perform handshaking between clock ratio controllers 106a-n and processor cores 110a-n. In an embodiment, resynchronization requests 130a-n are an indication from clock ratio controllers 106a-n to processor cores 110a-n that a clock ratio adjustment is about to occur. Ratio lock signals 132a-n are an indication from processor cores 110a-n to clock ratio controllers 106a-n that processor cores 110a-n are ready for a new clock frequency signal.

Clock ratio controllers 106a-n generate frequency ready signals 134a-n. Frequency ready signals 134a-n are sent to voltage controllers 107a-n to acknowledge when a new frequency has been set.

Voltage controllers 107a-n control the voltage levels used to run processor cores 110a-n. As shown in FIG. 1A, in an embodiment, each voltage controller 107a-n sends a voltage ready signal 136a-n to each clock ratio controller 106a-n to acknowledge when a new voltage level has been set. Each voltage controller 107a-n also sends a voltage or voltage level signal 138a-n to each processor core 110a-n to power each processor core 110a-n.

In an embodiment, if VM signals 113a-n indicate a voltage decrease that would require a frequency decrease, voltage controllers 107a-n may wait for frequency ready signals 134a-n before adjusting the voltage. If FM signals 111a-n indicate a frequency increase that would require a voltage increase, clock ratio controllers 106a-n may wait for voltage ready signals 136a-n before adjusting the frequency.

Coherency manager 108 coordinates cache memory access for processor cores 110a-n. As shown in FIG. 1A, coherency manager 108 and processor cores 110a-n are coupled together by busses 122a-n. In an embodiment, coherency manager 108 runs at the same clock speed as the fastest processor core 110a-n.

Processor cores 110a-n are used to execute instructions. In embodiments, processor cores 110a-n are coupled to other digital circuitry using busses 122a-n. Processor cores 110a-n and other digital circuitry, such as, for example coherency manager 108, may run at the same or different clock speeds while transmitting data.

Coherency manager 108 includes transceivers 142a-n and processor cores 110a-n each include a respective transmitter/receiver or transceiver 140a-n. The operation of transceivers 140a-n and 142a-n is described in greater detail below with respect to FIG. 1B.

FIG. 1B shows an example interface between a processor core 110 and coherency manager 108. Transceiver 140 of processor core 110 includes transmit register 152a and receive register 154a. Transmit register 152a takes data (out) signal 156a as an input, and outputs the data onto bus 122-1 when it receives an enabled core strobe (out) signal 126, which controls an enable pin of transmit register 152a, and when it receives a trigger core clock signal 128, which clocks transmit register 152a.

Receive register 154a takes data from bus 122-2 as an input, and outputs the data as data (in) signal 158a to various components within processor core 110 when it receives an enabled core strobe (in) signal 124, which controls an enable pin of receive register 154a, and when it receives a trigger core clock signal 128, which clocks receive register 154a.

Transceiver 142 of coherency manager 108 includes transmit register 152b and receive register 154b. Transmit register 152b takes data (out) signal 156b as an input, and outputs the data onto bus 122-2 when it receives an enabled bus strobe (out) signal 118, which controls an enable pin of transmit register 152b, and when it receives a trigger bus clock signal 120, which clocks transmit register 152b.

Receive register 154b takes data from bus 122-1 as an input, and outputs the data as data (in) signal 158b to various components within coherency manager 108 when it receives an enabled bus strobe (in) signal 116, which controls an enable pin of receive register 154b, and when it receives a trigger bus clock signal 120, which clocks receive register 154b.

Although FIG. 1B depicts the interface between processor core 110 and coherency manager 108, this interface may apply to any digital circuitry in system 100.

Figure 2A:
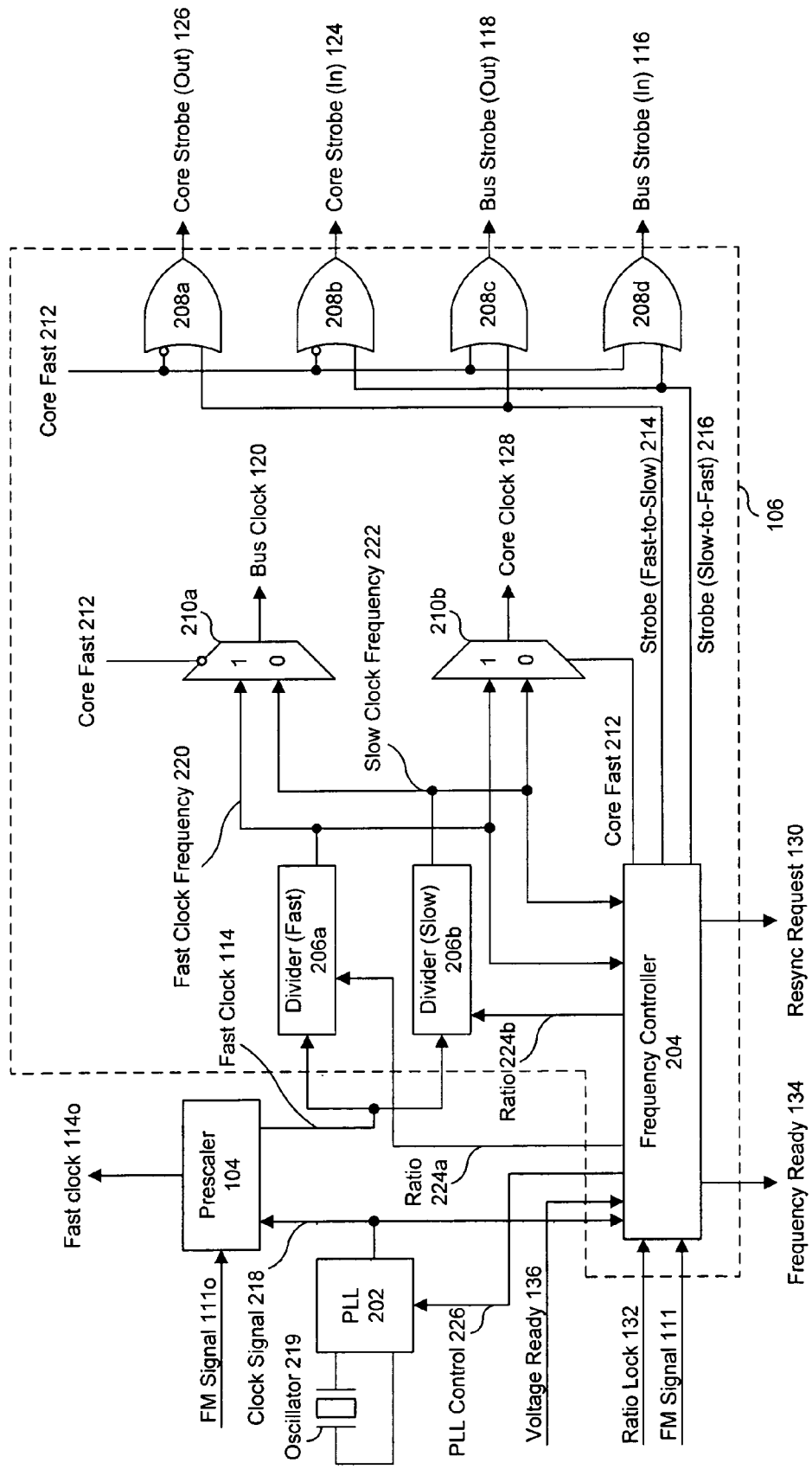
Figure 2B:
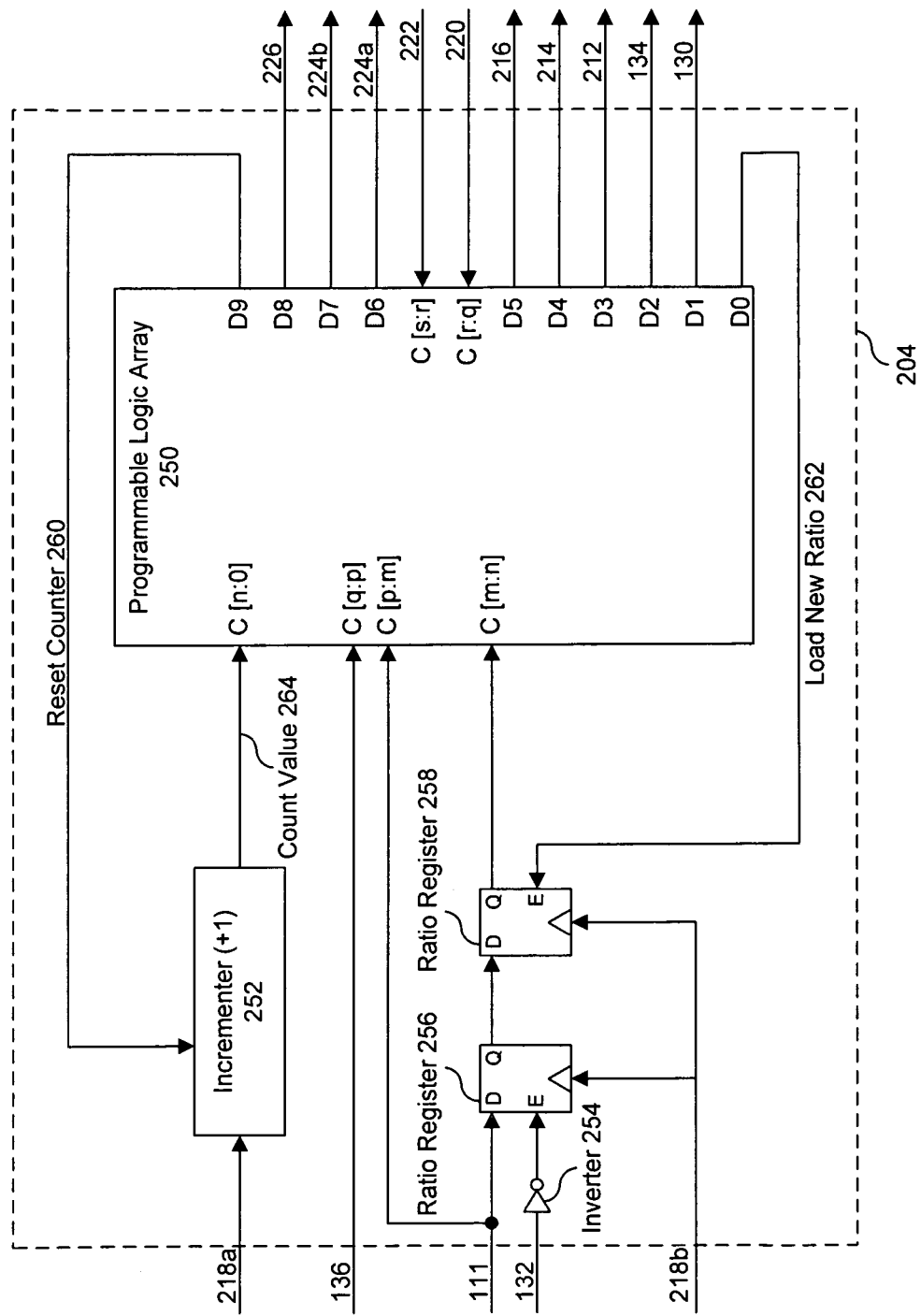

FIGS. 2A-B are diagrams that further illustrate an example clock ratio controller 106 according to an embodiment of the present invention. As shown in FIG. 2A, clock ratio controller 106 is coupled to a phase-locked loop (PLL) 202 and prescaler 104 of digital system 100.

PLL 202 outputs a clock signal 218 based on, for example, timing pulses generated by an oscillator 219. Clock signal 218 is provided to prescaler 104 and a frequency controller 204. In an embodiment, PLL 202 is controlled by frequency controller 204 using a PLL control signal 226.

In an embodiment, prescaler 104 provides clock signal 218 to clock ratio controller 106 as a fast clock signal 114. Fast clock signal 114 can be a clock signal running at the same rate as clock signal 218, or fast clock signal 114 can be a clock signal running at a scaled/slower rate than clock signal 218.

As shown in FIG. 2A, in an embodiment, clock ratio controller 106 includes frequency controller 204, a fast clock signal divider 206a, a slow clock signal divider 206b, logic (e.g., OR gates) 208a-d, and multiplexers 210a-b. Frequency controller 204 generates a core fast signal 212, a strobe (fast-to-slow) signal 214, and a strobe (slow-to-fast) signal 216. Core fast signal 212 is used to indicate whether an associated processor core 110 is to be driven by the output of clock signal divider 206a or the output of clock signal divider 206b. Strobe (fast-to-slow) signal 214 and strobe (slow-to-fast) signal 216 are used to indicate when data transfers can be performed.

In an embodiment, frequency controller 204 determines a clock ratio between the output of fast clock signal divider 206a and the output of slow clock signal divider 206b based on FM signal 111 received from power manager 102 (see FIG. 1A). As is described in greater detail below, frequency controller 204 allows for a seamless change of clock ratios.

Fast clock signal divider 206a operates on fast clock signal 114 from prescaler 104 based on a ratio signal 224a from frequency controller 204 to generate a fast clock frequency signal 220 that can be used to drive an associated transceiver 142 of coherency manager 108 or an associated transceiver 140 of a processor core 110. Fast clock frequency signal 220 is not necessarily the fastest possible clock frequency that may be used to drive a component of digital system 100. In an embodiment, fast clock frequency signal 220 is provided to frequency controller 204.

Slow clock signal divider 206b operates on fast clock signal 114 from prescaler 104 based on a ratio signal 224b from frequency controller 204 to generate a slow clock frequency signal 222 that can be used to drive an associated coherency manager transceiver 142 or an associated processor core 110. Slow clock frequency signal 222 is not necessarily the slowest clock frequency that may be used to drive a component of digital system 100. In an embodiment, slow clock frequency signal 222 is provided to frequency controller 204.

As shown in FIG. 2A, the core fast signal 212 generated by frequency controller 204 is coupled to multiplexers 210a-b and used to determine which clock signal generated by clock ratio controller 106 (e.g., fast clock frequency signal 220 or slow clock frequency signal 222) is used as bus clock signal 120 and core clock signal 128.

In an embodiment, frequency controller 204 monitors the alignment of fast clock frequency signal 220 and slow clock frequency signal 222. This is done, for example, in one embodiment using counters. Because fast clock frequency signal 220 and slow clock frequency signal 222 originate from a common source (e.g., fast clock signal 114), fast clock frequency signal 220 and slow clock frequency signal 222 align every n-cycles, where the clock ratio is either 1-to-n or 1-to-n/2. Furthermore, because frequency controller 204 knows the clock ratio and controls PLL 202, frequency controller 204 knows when clock signal generation begins and can use one or more counters to count down from n to 0 (e.g., decrementing the counter by one for each fast clock frequency signal 220 cycle). When the one or more counters reach 0, for example, an alignment occurs. The one or more counters can then be reset to n again to begin the next countdown.

As shown in FIG. 2A, logic (e.g., OR gates) 208a-d take as inputs strobe signal 214 or strobe signal 216 as well as core fast signal 212. Logic 208a-d uses these input signals to generate bus strobe (in) signal 116, bus strobe (out) signal 118, core strobe (in) signal 124 and core strobe (out) signal 126. As an example, if core fast signal 212 is a logic value 0, indicating that core clock signal 128 is equal to slow clock frequency signal 222, then core strobe (in) signal 124 and core strobe (out) signal 126 are both held at a logic value 1. In an embodiment, a constant high signal indicates that an associated processor core 110 can exchange data with a peripheral device running at the same rate as fast clock frequency signal 220, for example, after any rising edge of core clock signal 128.

Because the strobe signals are generated within clock ratio controller 106 allows for fast clock frequency signal 220 and slow clock frequency signal 222 to be assigned to either an associated coherency manager transceiver or an associated processor core. As is described in more detail below, this characteristic allows digital system 100 to eliminate any restriction on the clock frequency of the associated processor core in relation to the associated coherency manager transceiver. It is a feature of embodiments of the present invention that the present invention can be used to implement a wide range of different clock ratios including arbitrary clock ratios.

In an embodiment, frequency controller 204 adjusts the clock ratio between fast clock signal divider 206a and slow clock signal divider 206b based on a received FM signal 111 and voltage ready signal 136, if applicable, by generating resync request 130. Again, as mentioned above, voltage ready signal 136 may be required before generating resync request 130 if FM signal 111 indicates a frequency increase that requires a voltage increase. Otherwise, the value of voltage ready signal 136 may be ignored. The processor core being driven by clock ratio controller 106 receives this resync request 130 and disables ratio lock signal 132 when it is ready to start receiving a new clock signal. After ratio lock signal 132 is disabled by the processor core, frequency controller 204 is free to adjust the clock ratio. In one embodiment, frequency controller 204 begins to generate a new clock signal based on the new ratio when fast clock frequency signal 220 and slow clock frequency signal 222 are aligned. In a second embodiment, frequency controller 204 begins to generate a new clock signal based on the new ratio while the previous clock signal(s)/ratio is still in use. The new clock signal(s)/ratio is automatically swapped for the previous clock signal(s)/ratio when an alignment between the signals occurs. In an embodiment, this is possible, for example, because counters used to determine signal alignment not only indicate when an alignment has occurred, but they also indicate how many clock cycles are left until the next alignment occurs. The new clock signal(s)/ratio, and the corresponding new fast and slow clock frequency signals, can be generated beforehand to ensure a smooth transition from the old clock signal(s)/ratio to new clock signal(s)/ratio. Once the new clock signal(s)/ratio has been generated, frequency controller 204 generates frequency ready signal 134.

In an embodiment, strobe (fast-to-slow) signal 214 and strobe (slow-to-fast) signal 216 are stored in memory. In a second embodiment, strobe (fast-to-slow) signal 214 and strobe (slow-to-fast) signal 216 are hard coded in boolean logic. In a third embodiment, strobe (fast-to-slow) signal 214 and strobe (slow-to-fast) signal 216 are calculated immediately based on an upcoming edge of a new fast clock frequency signal 220 and an upcoming edge of a new slow clock frequency signal 222, where the new fast and slow clock frequency signals 220 and 222 are based on a new clock ratio. The generation of strobe (fast-to-slow) signal 214 and strobe (slow-to-fast) signal 216 is described in greater detail below with respect to FIG. 2B.

FIG. 2B is a diagram that further illustrates an example frequency controller 204 according to an embodiment of the present invention. As shown in FIG. 2B, in an embodiment, frequency controller 204 includes a programmable logic array 250, an incrementer 252, an inverter 254, and two ratio registers 256 and 258.

In an embodiment, programmable logic array 250 implements boolean logic to perform the below mentioned functions. Programmable logic array 250 generates resync request signal 130, frequency ready signal 134, core fast signal 212, strobe (fast-to-slow) signal 214, strobe (slow-to-fast) signal 216, ratio signals 224a and 224b, and PLL control signal 226 based on voltage ready signal 136, fast clock frequency signal 220, slow clock frequency signal 222, an FM signal 111, and a count value 264.

In an embodiment, incrementer 252 takes as input clock signal 218a and a reset counter 260 to output a count value 264 each clock signal 218 clock cycle. Count value 264 starts at zero and increments by 1 each clock cycle until reset counter 260 is enabled, which results in count value 264 becoming zero again on the next clock cycle. Reset counter 260 is enabled when count value 264 reaches a maximum incremental value. The maximum incremental value is dependent on the clock ratio indicated by FM signal 111. For example, if FM signal 111 indicates a clock ratio of 1:6, then the maximum incremental value may be six.

Ratio registers 256 and 258 serve as buffers between FM signal 111 and programmable logic array 250. FM signal 111 may change to indicate a new clock ratio to be used, however ratio registers 256 and 258 prevent programmable logic array 250 from using this new ratio until it is ready. In an embodiment, FM signal 111 is allowed to pass through ratio register 256 when ratio lock 132 is disabled. Inverter 254 then serves to send an enabled signal to ratio register 256 when ratio lock 132 is disabled. Since, as described below, FM signal 111 may be analyzed at input C [p:m], programmable logic array 250 may output resync request signal 130 upon receiving FM signal 111. As described above, a resync request signal 130 leads to an eventual change in ratio lock 132. FM signal 111 is allowed to pass though ratio register 258 when programmable logic array 250 outputs a load new ratio signal 262.

Programmable logic array 250 outputs load new ratio signal 262 based on the received voltage ready signal 136 and count value 264. As described above, if a frequency of a processor core cannot be changed unless its voltage is also changed, then programmable logic array 250 will at least wait for an enabled voltage ready signal 136 before enabling load new ratio signal 262. Programmable logic array 250 may analyze FM signal 111, without modifying its current clock ratio, at input C [p:m] to determine if an enabled voltage ready signal 136 is necessary. Count value 264 indicates if an alignment is occurring or when an alignment will occur. Depending on when a new clock ratio is to be generated, either before an alignment or during the alignment, programmable logic array 250 may use count value 264 to determine an appropriate time to enable load new ratio signal 262. Both ratio registers 256 and 258 are clocked at clock signal 218b, which comes from PLL 202.

Once programmable logic array 250, in an embodiment, receives FM signal 111 at input C [m:n], it begins the new clock ratio generation process. Once programmable logic array 250 generates the new clock ratio, it enables frequency ready signal 134, and sends ratios 224a and 224b to fast clock signal divider 206a and slow clock signal divider 206b, respectively.

In an embodiment, programmable logic array 250 may analyze FM signal 111 at input C [p:m] without modifying the clock ratio since input C [p:m] does not modify C [m:n], which ultimately controls the clock ratio.

FM signal 111 may also determine which component receives fast clock frequency signal 220 and slow clock frequency signal 222. Therefore, core fast 212 may be derived from FM signal 111. Programmable logic array 250 may also control PLL 202 using PLL control signal 226.

In an embodiment, strobe (fast-to-slow) signal 214 and strobe (slow-to-fast) signal 216 are generated based on count value 264. As an example, it is assumed that both fast clock frequency signal 220 and slow clock frequency signal 222 begin with a rising edge. If count value 264 equals zero, strobe (fast-to-slow) signal 214 is enabled. At a same or different time, the next rising edge of slow clock frequency signal 222 is calculated. This may be calculated based on the current count value 264, and how many clock cycles are left before count value 264 reaches the maximum incremental value. If, on the next clock cycle, count value 264 equals one and it is not a clock cycle before the next rising edge of slow clock frequency signal 222, then strobe (fast-to-slow) signal 214 is disabled. Strobe (fast-to-slow) signal 214 will be enabled again at the clock cycle before the next rising edge of slow clock frequency signal 222. If, on this next clock cycle, count value 264 equals one and it is the clock cycle before the next rising edge of slow clock frequency signal 222, then strobe (fast-to-slow) signal 214 remains enabled.

Strobe (slow-to-fast) signal 216 may be enabled at a same clock cycle as a rising edge of slow clock frequency signal 222. There may be some latency between the rising edge of slow clock frequency signal 222 and a rising edge of strobe (slow-to-fast) signal 216. Strobe (slow-to-fast) signal 216 may be disabled on a next rising edge of fast clock frequency signal 220. Again, count value 264 may indicate when each of these rising edges occur.

In an alternate embodiment, strobe (fast-to-slow) signal 214 and strobe (slow-to-fast) signal 216 are generated based on a next rising edge for both fast clock frequency signal 220 and slow clock frequency signal 222. Programmable logic array 250 may analyze fast clock frequency signal 220 and slow clock frequency signal 222 using the same methods used to analyze count value 264, as described above, to determine strobe (fast-to-slow) signal 214 and strobe (slow-to-fast) signal 216.

Strobe (fast-to-slow) signal 214 and strobe (slow-to-fast) signal 216 help maintain synchronization between components of a digital system, such as, for example, a processor core and a coherency manager, even during a change of frequency for one or both components. No loss of data occurs due to a change in frequency and no handshaking is required to resynchronize the two components. The operation of strobe (fast-to-slow) signal 214 and strobe (slow-to-fast) signal 216 is described in greater detail below.

Figure 3A:
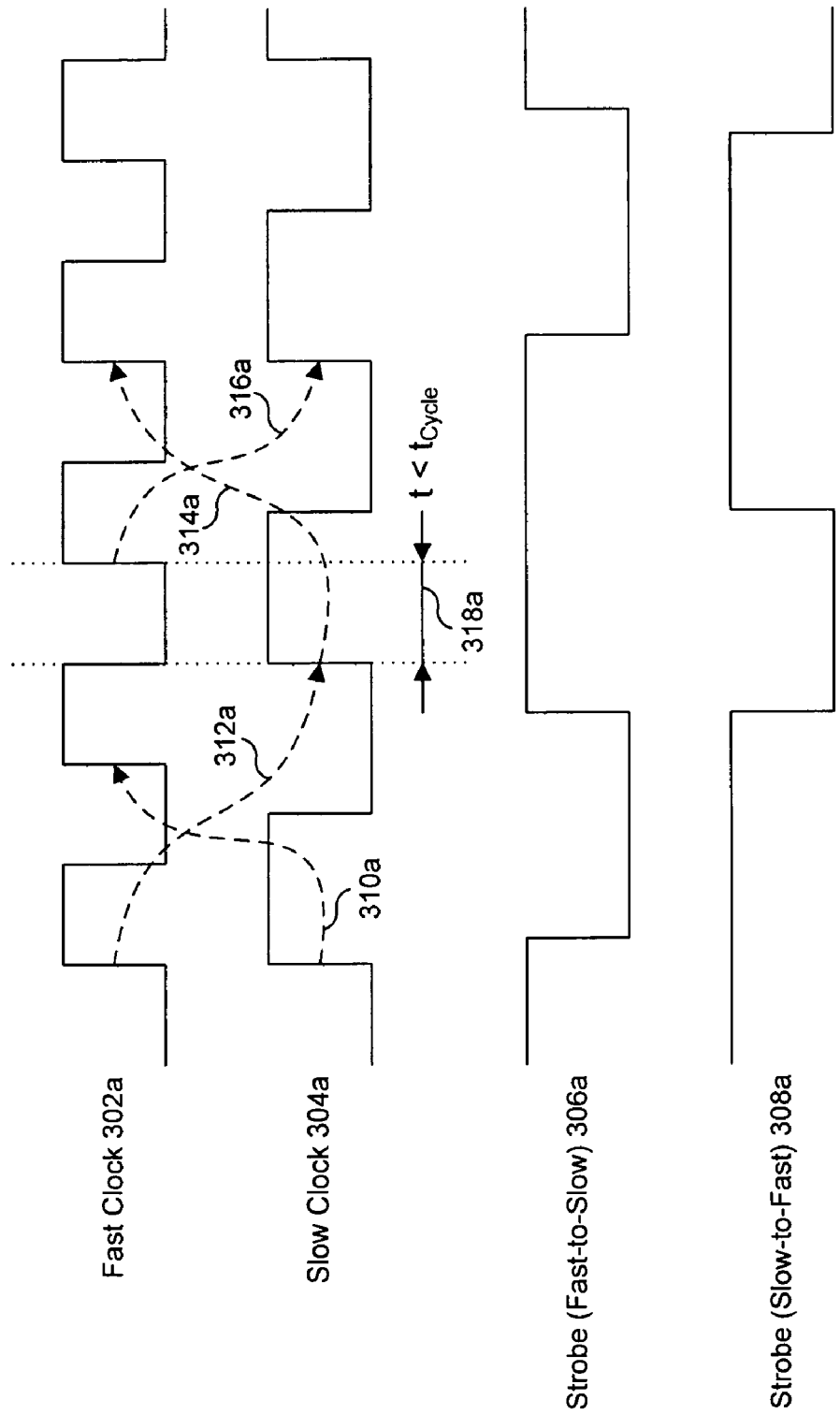
FIG. 3A is a first diagram that illustrates a data transmission process for an example digital system according to an embodiment of the present invention.
Figure 3B:
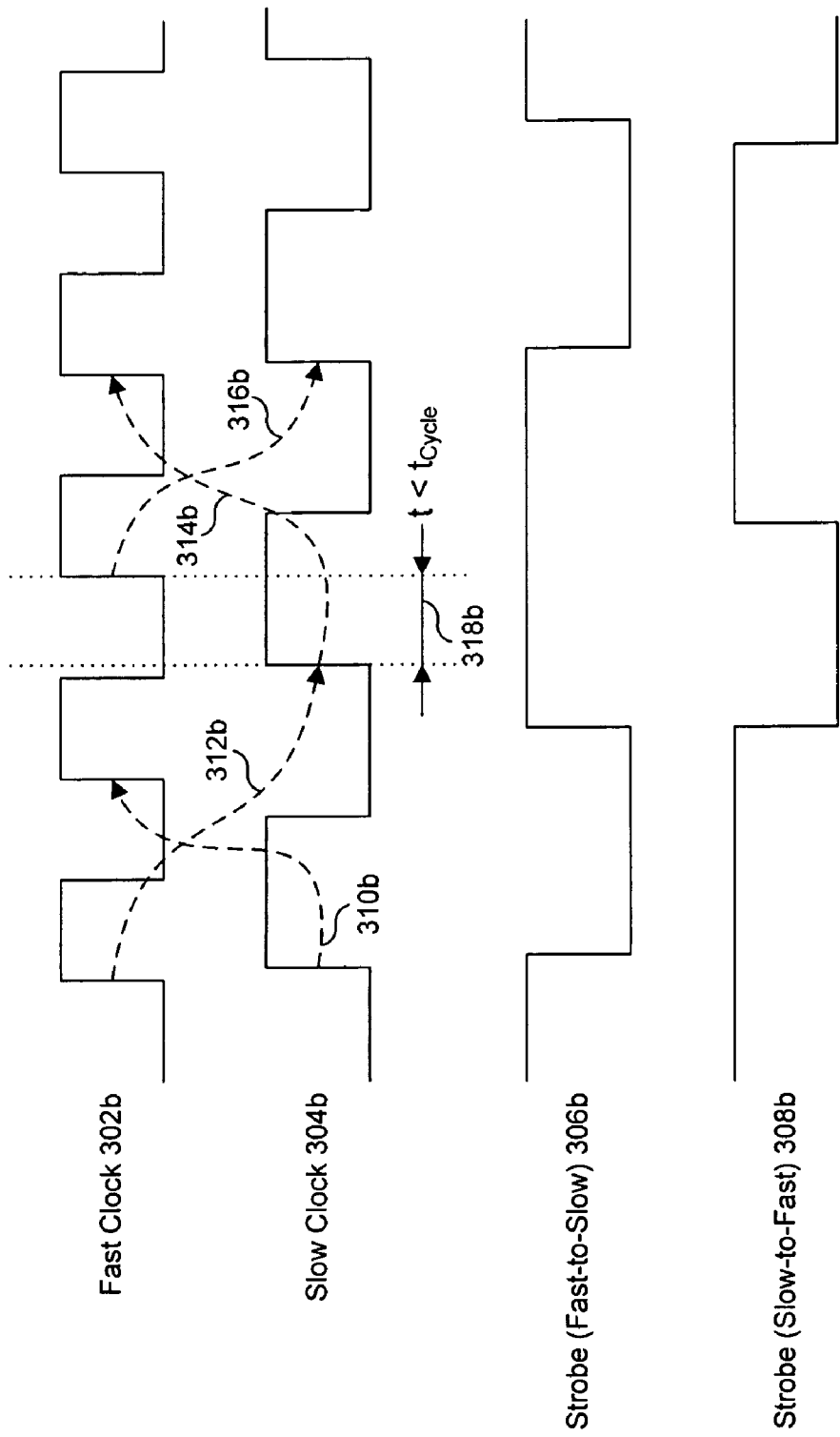
FIG. 3B is a second diagram that illustrates a data transmission process for an example digital system according to an embodiment of the present invention.

FIGS. 3A-B are timing diagrams that illustrate example data transmission processes for digital system 100 according to embodiments of the present invention. As shown in FIGS. 3A-B, fast clock signals 302a-b are running at 1.5 times the speed of slow clock signals 304a-b. Strobe (fast-to-slow) signals 306a-b and strobe (slow-to-fast) signals 308a-b are used to determine when the coherency manager transceivers or processor core transceivers being driven by fast clock signals 302a-b can perform data transfers. As an example, strobe (fast-to-slow) signals 306a-b and strobe (slow-to-fast) signals 308a-b represent those strobe signals seen by the transceiver registers. In an embodiment, the coherency manager transceivers or processor core transceivers being driven by fast clock signals 302a-b are allowed to transmit data to processor core transceivers or coherency manager transceivers being driven by slow clock signals 304a-b when strobe signals 306a-b are high and fast clock signals 302a-b have a rising edge. The coherency manager transceivers or processor core transceivers being driven by fast clock signals 302a-b are allowed to receive data from processor core transceivers or coherency manager transceivers being driven by slow clock signals 304a-b when strobe signals 308a-b are high and fast clock signals 302a-b have a rising edge. In an alternate embodiment, receive and send operations are completed when the corresponding strobes are high and fast clock signals 302a-b have a falling edge.

As shown in FIG. 3A-B, transitions 310a-b and 314a-b correspond to receive operations. Transitions 312a-b and 316a-b correspond to send operations. The timing differences 318a-b indicate a known phase relationship between fast clock signals 302a-b and slow clock signals 304a-b. In an embodiment, as long as these phases are known, and the phase differences are greater than any known latency, digital system 100 will operate properly. The phase difference may arise from one component, that receives fast clock signals 302a-b or slow clock signals 304a-b, being farther away from clock ratio controllers 106a-n than a second component receiving the other clock signal. Fast clock signals 302a-b and slow clock signals 304a-b may not have a phase difference in clock signals when initially generated by clock ratio controllers 106a-n. As noted herein, digital system 100 is not limited in its power reducing or data transmission ability by the clock frequency of a coherency manager transceiver. Any processor core can have a clock frequency slower than its associated coherency manager transceiver, and vice-versa, without incurring an interruption in operation due to a clock ratio change.

Referring to FIG. 3A, fast clock signal 302a and slow clock signal 304a align on each signals' rising edge every three fast clock signal 302a cycles or every two slow clock signal 304a cycles. Each alignment can be considered the beginning of a new cycle. In an embodiment, this alignment guarantees that the coherency manager transceiver or processor core transceiver driven by slow clock signal 304a will be able to transmit data to a processor core transceiver or coherency manager transceiver driven by fast clock signal 302a on each slow clock signal 302a rising edge. This alignment also guarantees that a coherency manager transceiver or processor core transceiver being driven by fast clock signal 302a will be able to transmit data to a processor core transceiver or coherency manager transceiver being driven by slow clock signal 304a on each alignment.

As shown in FIG. 3B, fast clock signal 302b and slow clock signal 304b do not have rising edges that align at the same instance in time, where these clock signal timing diagrams represent each clock signal as seen by a particular component it is driving. There is a constant skew present between these clock signals, which, as described above, may have originated by the components not being of equal distance from clock ratio controllers 106a-n. However, if the skew between fast clock signal 302b and slow clock signal 304b is known, the beginning of each new cycle may be determined, for example, to be a point in time between a rising edge of fast clock signal 302b and a closest rising edge of slow clock signal 304b. The same assurances noted above with respect to the signals shown in FIG. 3A then apply with respect to the signals shown in FIG. 3B. In both cases, a synchronization pulse is unnecessary to align the clock signals. In an embodiment, the clock ratio ensures that clock signals align on rising edges, regardless of any skew present, as long as the phase difference is known.

Figure 4:
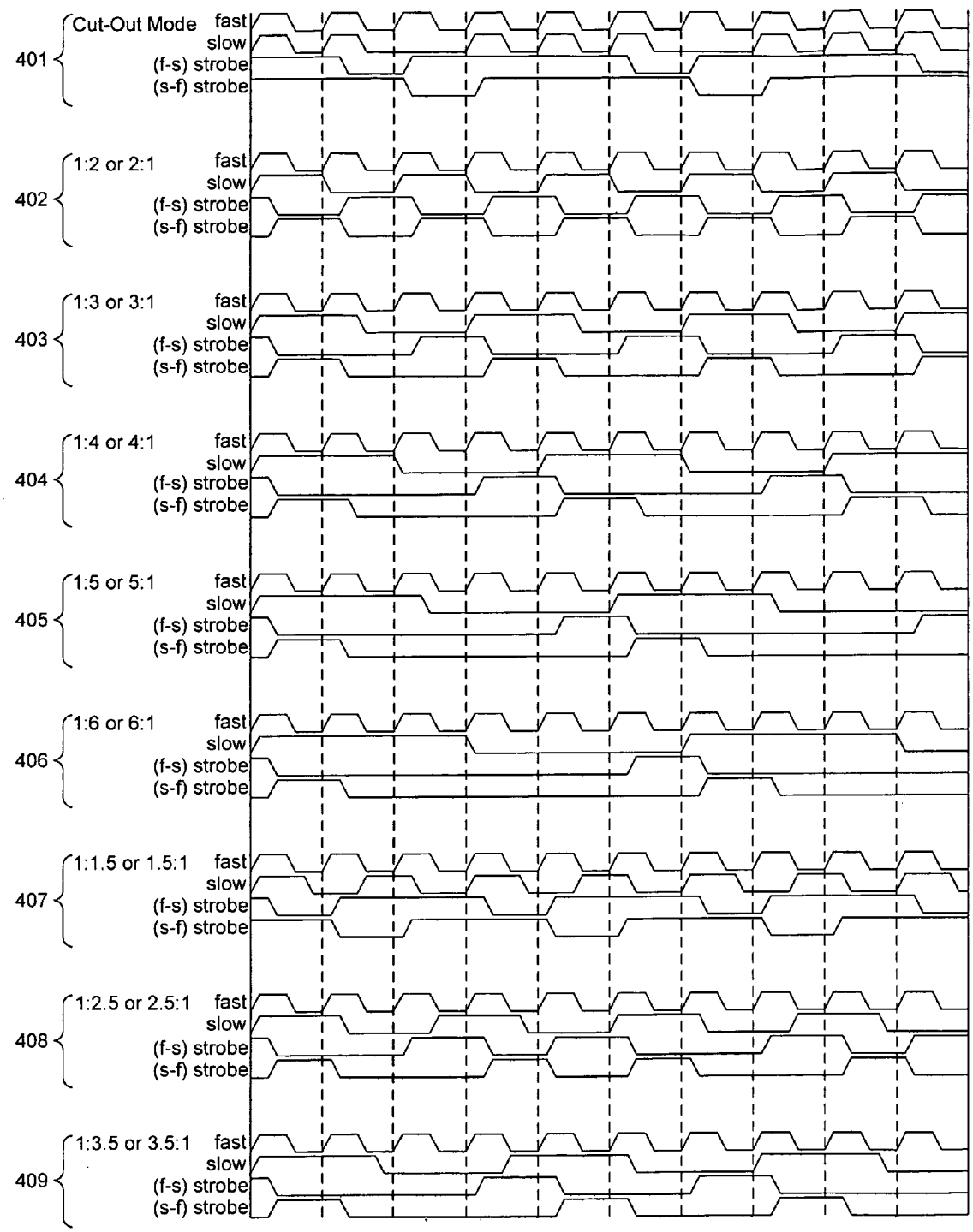
FIG. 4 is a first diagram that illustrates the timing of example clock and strobe signals according to an embodiment of the present invention.

FIG. 4 is a timing diagram of various exemplary clock ratios and strobe patterns 401-409 according to embodiments of the present invention. As shown in FIG. 4, nine different clock ratios are displayed. Each clock ratio is shown with a corresponding fast-to-slow (f-s) strobe signal and a corresponding slow-to-fast (s-f) strobe signal. As an example, the fast-to-slow strobe signals and the slow-to-fast strobe signals represent those strobe signals seen by the transceiver registers. The pattern and conditions for data transmission described herein with regard to FIGS. 3A-B apply to each set of clock ratios and strobe patterns 401-409. Frequency controller 204 (see FIG. 2A) can be used to generate any of the clock ratios illustrated and still achieve proper operation.

The strobing patterns described herein allow for power-reducing methods to be employed such as, for example, "clock cut-outs." The cut-out mode signals 401 illustrated in FIG. 4 can be used to suppress, for example, selected clock signal cycles. As shown in FIG. 4, in an embodiment, every 4th cycle of the slow clock signal is cut-out (see signals 401).

Fractional clock ratios, such as those shown in clock ratios and strobe patterns 407-409, may be achieved by using counters that run at a faster clock frequency than a fastest processor core 110 clock frequency. Those faster clock frequencies may be derived either through an output of PLL 202 or through frequency doubler circuits. In an embodiment, frequency doubler circuits, not shown, take as input a clock signal, and output a clock signal that is twice the frequency of the input clock signal.

Figure 5:
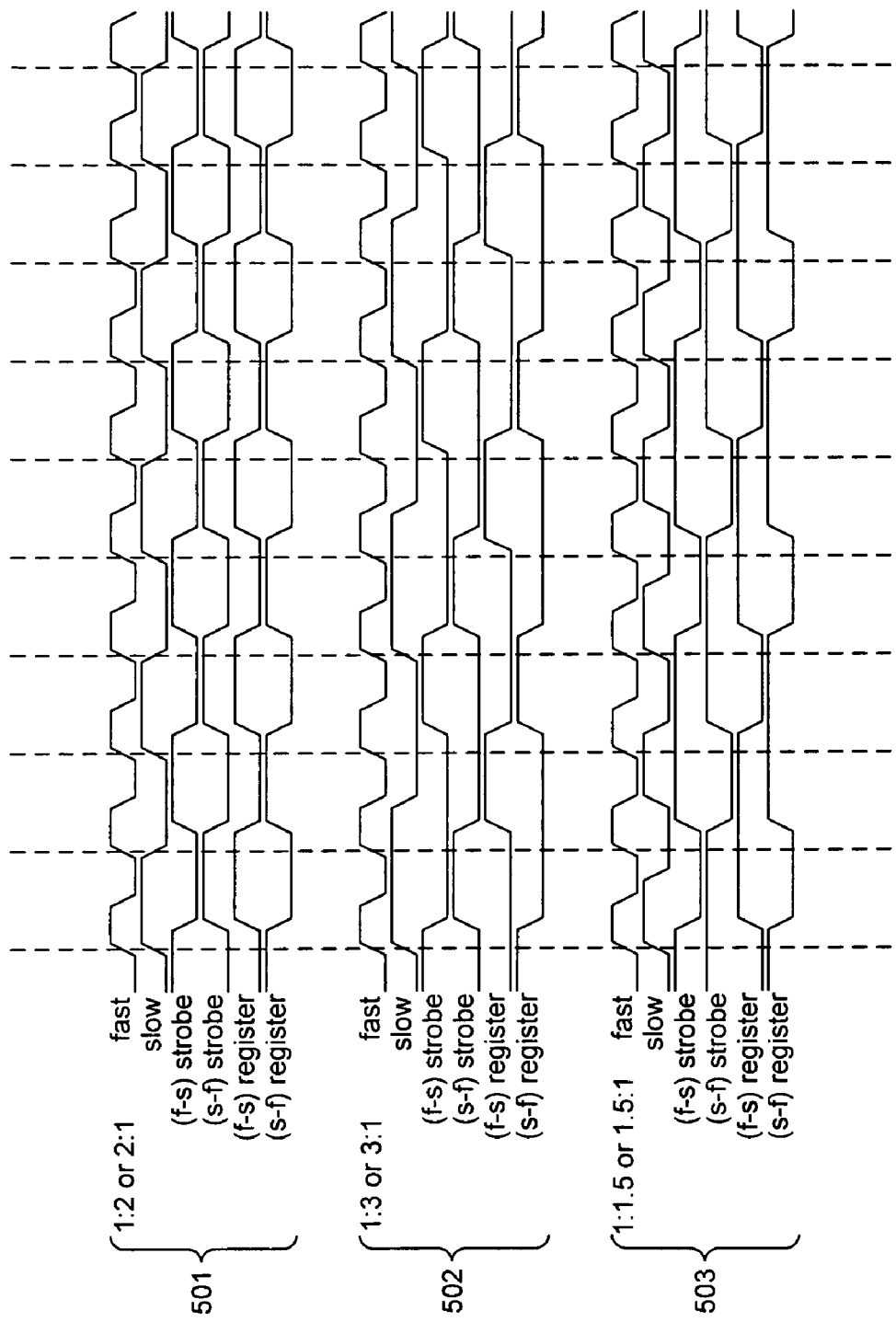
FIG. 5 is a second diagram that illustrates the timing of example clock and strobe signals according to an embodiment of the present invention.

FIG. 5 is a more detailed timing diagram of exemplary clock ratios and strobe patterns 501-503 according to an embodiment of the present invention. Clock ratios and strobe patterns 501-503 are similar to those found in FIG. 4, except that two extra signals have been added. These signals are a fast-to-slow (f-s) register signal and a slow-to-fast (s-f) register signal. These signals represent a physical implementation of the strobe values stored in the transceiver registers, but one clock cycle ahead. Some bus protocols that may utilize this algorithm may require strobe signals to be registered beforehand. In an embodiment, frequency controller 204 may generate the strobe signals one clock cycle earlier than as described above, and then delay the strobe signals by one clock cycle using a clocked device, such as, for example, a register, before they reach the transceiver registers. The fast-to-slow register signal corresponds to the fast-to-slow strobe signal. The slow-to-fast register signal corresponds to the slow-to-fast strobe signal.

The timing diagrams of FIG. 5 show how the clock frequency of a processor core or a bus can be synchronized to a new clock ratio with no disruption in data transmission. The strobe patterns are such that the values stored in a fast-to-slow register and a slow-to-fast register are always the same for each fast and slow clock alignment, regardless of the clock ratio. As shown in FIG. 5, for each alignment of the fast and slow clocks, the fast-to-slow register value is a logical low and slow-to-fast register value is a logical high. This allows for seamless transition between clock ratios as long as the latency to adjust the clock ratios does not exceed one fast clock signal cycle. The change will be transparent to the processor core or bus, as neither will see a glitch or temporary strobe signal loss. This allows for continuous data transmission.

Figure 6:
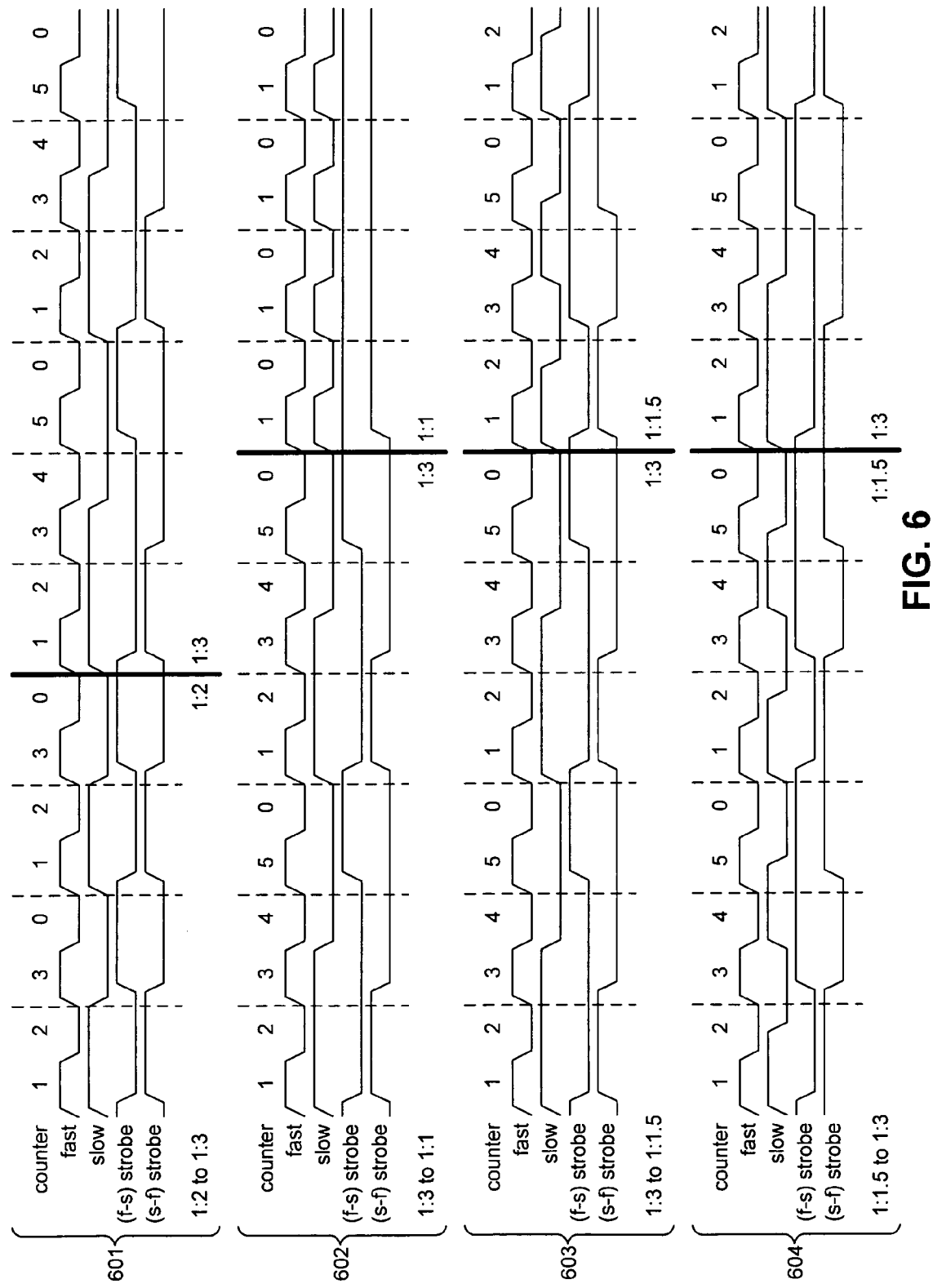
FIG. 6 is a diagram that illustrates clock ratio switching patterns according to an embodiment of the present invention.

FIG. 6 is a detailed timing diagram of exemplary clock ratio switching patterns 601-604 according to an embodiment of the present invention. Counters for each clock ratio switching pattern 601-604 indicate when an alignment is about to occur. In each case, a "0" indicates an alignment will occur on the following clock cycle. The counters are dependent on the clock ratio, with the counters incrementing by one and counting to two times a least common denominator of the two numbers that make up the clock ratio before repeating. For example, the counter for clock ratio switching pattern 601 begins at one when the system is in the 1:2 ratio, and counts to three, and then to zero before repeating. An alignment of the fast and slow clocks happens each time the counter reaches zero.

As mentioned above, a process of switching clock ratios does not necessarily begin on an alignment at a clock cycle after the counter reaches zero. In an embodiment, the process of switching clock ratios is initiated before an alignment, such that the clock ratio can be immediately switched once an alignment does occur. This may be possible since the current value of the counter indicates how many clock cycles are left before an alignment is to occur.

Fast-to-slow (f-s) strobe signal and slow-to-fast (s-f) strobe signal may be calculated automatically based on a next closest edge for each fast and slow clock signal based on the new clock ratio. As an example, these strobe signals represent those strobe signals seen by the transceiver registers. Since, as described above, (f-s) strobe signals and (s-f) strobe signals seen by the transceiver registers are always the same one clock cycle after an alignment, (f-s) strobe signals and (s-f) strobe signals may be changed without losing synchronization between a processor core and a coherency manager and thereby disrupting communications between the processor core and the coherency manager. Note that this rule does not apply for a 1:1 ratio; however, a 1:1 ratio is unique in that any processor core transceiver or coherency manager transceiver may transmit on any clock edge. The registers, as described in FIG. 1B, that control data transmission are continuously enabled during the 1:1 ratio.

Figure 7:
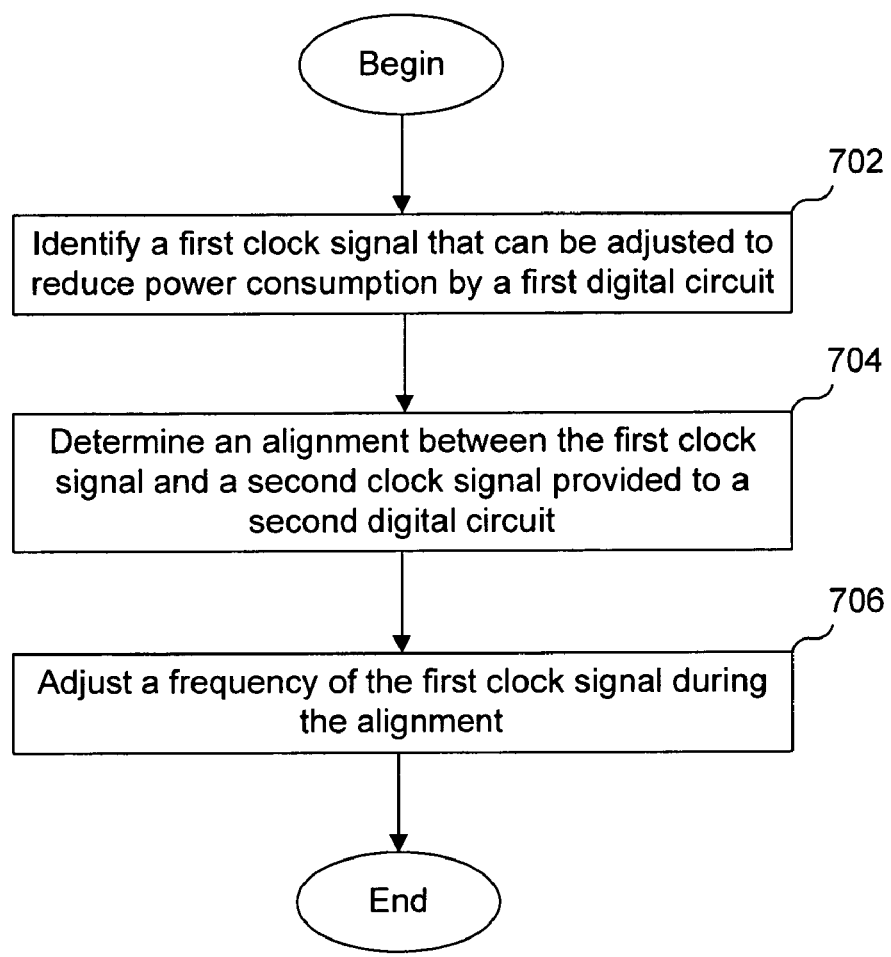
FIG. 7 is a flowchart of an example method for adjusting a clock signal according to an embodiment of the present invention.

FIG. 7 is a flowchart of an exemplary method 700 for adjusting a clock signal in a voltage/frequency scaled digital system according to an embodiment of the present invention. In an embodiment, method 700 can be implemented in a digital system such as, for example, digital system 100 described herein. Method 700 begins at step 702.

In step 702, a first clock signal is identified that can be adjusted to reduce power consumption by a first digital circuit of the digital system. In an embodiment, the clock signal is a signal driving the digital circuit (e.g., a processor) whose processing capabilities are not currently needed or whose processing capabilities are not being fully utilized. Thus, reducing the frequency of the clock signal driving the first digital circuit will not have an adverse impact on the digital system to which the first digital circuit belongs.

In step 704, a determination is made regarding when the first clock signal is aligned with a clock signal supplied to a second digital circuit. In an embodiment, the two clock signals are determined to be aligned when an edge of the first clock signal corresponds to an edge of the second clock signal. These edges can be rising edges or falling edges. In an embodiment, step 704 takes into account any phase difference that may exist between the two clock signals when determining whether the clock signals are aligned.

In step 706, the frequency of the first clock signal is adjusted. In embodiments, the frequency is adjusted during the alignment identified in step 704. Although the frequency is changed, the frequency change does not result in any communication dead time between the first digital circuit and the second digital circuit. Furthermore, the frequency change can be implemented while data is being transferred between the first digital circuit and the second digital circuit without interrupting data transfer.

Figure 8:
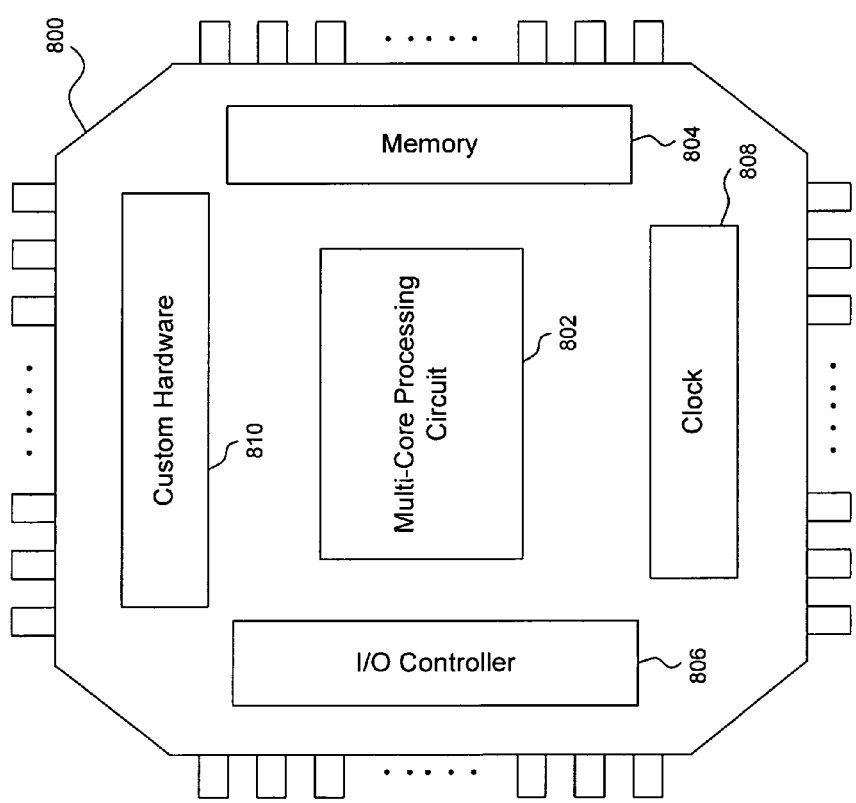
FIG. 8 is a diagram that illustrates an example digital system according to an embodiment of the present invention.

FIG. 8 is a diagram of an example digital circuit of system 800 according to an embodiment of the present invention. System 800 includes a multi-core processing circuit 802, a memory 804, an input/output (I/O) controller 806, a clock 808, and custom hardware 810. In an embodiment, system 800 is a system on a chip (SOC) in an application specific integrated circuit (ASIC).

Multi-core processing circuit 802 is any multiple core processing circuit that includes features of the present invention described herein and/or that implements a method embodiment of the present invention. In one embodiment, each processor core of multi-core processing circuit 802 includes an instruction fetch unit, an instruction cache, an instruction decode and dispatch unit, one or more instruction execution unit(s), a data cache, a register file, and a bus interface unit.

Memory 804 can be any memory capable of storing instructions and/or data. Memory 804 can include, for example, random access memory and/or read-only memory.

Input/output (I/O) controller 806 is used to enable components of system 800 to receive and/or send information to peripheral devices. I/O controller 806 can include, for example, an analog-to-digital converter and/or a digital-to-analog converter.

Clock 808 is used to determine when sequential subsystems of system 800 change state. For example, each time a clock signal of clock 808 ticks, state registers of system 800 capture signals generated by combinatorial logic. In an embodiment, the clock signal of clock 808 can be varied. The clock signal can also be divided, for example, before it is provided to selected components of system 800.

Custom hardware 810 is any hardware added to system 800 to tailor system 800 to a specific application. Custom hardware 810 can include, for example, hardware needed to decode audio and/or video signals, accelerate graphics operations, and/or implement a smart sensor. Persons skilled in the relevant arts will understand how to implement custom hardware 810 to tailor system 800 to a specific application.

While various embodiments of the present invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, SystemC Register Transfer Level (RTL), and so on, or other available programs. Such software can be disposed in any known computer usable medium such as semiconductor, magnetic disk, optical disk (e.g., CD-ROM, DVD-ROM, etc.).

It is understood that the apparatus and method embodiments described herein may be included in a semiconductor intellectual property core, such as a microprocessor core (e.g., embodied in HDL) and transformed to hardware in the production of integrated circuits. Additionally, the apparatus and method embodiments described herein may be embodied as a combination of hardware and software. Thus, the present invention should not be limited by any of the above-described exemplary embodiments, but should be defined only in accordance with the following claims and their equivalence. Furthermore, it should be appreciated that the detailed description of the present invention provided herein, and not the summary and abstract sections, is intended to be used to interpret the claims. The summary and abstract sections may set forth one or more but not all exemplary embodiments of the present invention.

What is claimed is:

1. A digital system, comprising:
a first digital circuit that is configured to operate at a first rate determined by a first clock signal, wherein the first digital circuit includes a transmit register;
a second digital circuit, coupled to the first digital circuit by a bus, that is configured to operate at a second rate determined by a second clock signal, wherein the second digital circuit includes a receive register; and
a clock ratio controller that is configured to:
adjust a frequency of at least one of the first clock signal and the second clock signal in response to a power management signal while maintaining a ratio of the first clock signal to the second clock signal, and
output strobe signals that enable operation of the transmit register and the receive register.

2. The digital system of claim 1, wherein the clock ratio controller is configured to adjust the frequency during an alignment of an edge of the first clock signal and an edge of the second clock signal.

3. The digital system of claim 1, further comprising a voltage controller that is configured to adjust a voltage level supplied to the first digital circuit.

4. The method of claim 1, wherein the clock ratio controller is further configured to set a new frequency ratio of the first clock signal to the second clock signal in response to a ratio signal.

5. The method of claim 4, wherein the clock ratio controller is further configured to set the new frequency ratio based on a voltage level supplied to at least one of the first and second digital circuits.

6. A tangible computer readable storage medium comprising a digital system embodied in software, the digital system comprising:
a first digital circuit that is configured to operate at a first rate determined by a first clock signal, wherein the first digital circuit includes a transmit register;
a second digital circuit, coupled to the first digital circuit by a bus, that is configured to operate at a second rate determined by a second clock signal, wherein the second digital circuit includes a receive register; and
a clock ratio controller that is configured to:
adjust a frequency of at least one of the first clock signal and the second clock signal in response to a power management signal while maintaining a frequency ratio of the first clock signal to the second clock signal, and
output strobe signals that enable operation of the transmit register and the receive register.

7. The tangible computer readable storage medium of claim 6, wherein the clock ratio controller is configured to adjust the frequency during an alignment of an edge of the first clock signal and an edge of the second clock signal.

8. The tangible computer readable storage medium of claim 6, wherein the digital system is embodied in hardware description language software.

9. The tangible computer readable storage medium of claim 6, wherein the digital system is embodied in one of Verilog hardware description language software and VHDL hardware description language software.

10. A method of controlling clocking frequencies in a digital system, wherein the digital system includes at least a first digital circuit having a transmit register and a second digital circuit having a receive register, the registers coupled together by a bus, the bus configured to facilitate communication between the first digital circuit and the second digital circuit, the method comprising:

(1) generating a first clock signal that is provided to the first digital circuit and a second clock signal that is provided to the second digital circuit, the first and second clock signals having an initial frequency ratio;

(2) generating a new frequency ratio based on a received ratio signal;

(3) determining an alignment between the first clock signal and the second clock signal;

(4) generating strobe signals that enable operation of the transmit register and the receive register;

(5) adjusting the frequency of one of the first clock signal and the second clock signal when a strobe signal generated in (4) enables operation of the transmit register, wherein the adjusting is performed in order to achieve a new frequency ratio.

11. The method of claim 10, wherein (3) comprises determining an alignment between an edge of the first clock signal and an edge of the second clock signal.

12. The method of claim 10, further comprising:
(6) adjusting a voltage level supplied to the first digital circuit.

13. The method of claim 10, further comprising:
(6) adjusting a frequency of the second clock signal during the alignment.

14. The method of claim 10, wherein the implementing of the new frequency ratio comprises adjusting both the first clock signal and the second clock signal at a time determined based on the determined alignment.

* * * * *